(12) United States Patent
Polad

(10) Patent No.: US 6,581,885 B2
(45) Date of Patent: Jun. 24, 2003

(54) CABLE BUNDLING AND SUPPORT DEVICE

(76) Inventor: Arthur A. Polad, 2565 W. 2780 South, Lot 178, West Valley City, UT (US) 84119

( * ) Notice: Subject to any disclaimer, the term of this patent is extended or adjusted under 35 U.S.C. 154(b) by 0 days.

(21) Appl. No.: 10/036,217

(22) Filed: Dec. 24, 2001

(65) Prior Publication Data

US 2002/0060275 A1 May 23, 2002

Related U.S. Application Data

(63) Continuation-in-part of application No. 09/079,690, filed on May 15, 1998, now Pat. No. 6,349,904.

(51) Int. Cl.$^7$ .............................. F16L 3/137; F16L 3/14
(52) U.S. Cl. .................. 248/74.3; 248/74.5; 248/205.3; 24/16 PB
(58) Field of Search ................ 248/60, 74.3, 74.5, 248/205.2, 205.3, 316.5, 228.8, 230.8, 68.1, 74.1, 74.2; 24/16 R, 16 PB; D8/396

(56) References Cited

U.S. PATENT DOCUMENTS

| | | | | | |
|---|---|---|---|---|---|
| 1,804,472 | A | * | 5/1931 | Leslie | 248/60 |
| 2,896,889 | A | * | 7/1959 | Hershberger et al. | 248/71 |
| 2,974,916 | A | * | 3/1961 | Richey | 248/74.3 |
| 3,050,578 | A | * | 8/1962 | Huebner | 248/74.3 |
| 3,157,377 | A | * | 11/1964 | Orenick | 248/71 |
| 3,169,004 | A | * | 2/1965 | Rapata | 248/74.5 |
| 3,913,876 | A | * | 10/1975 | McSherry | 24/484 |
| 4,274,612 | A | * | 6/1981 | Massey | 248/74.3 |
| 4,378,617 | A | * | 4/1983 | Burns | 24/336 |
| 4,466,159 | A | * | 8/1984 | Burrage | 24/16 PB |
| RE31,689 | E | * | 10/1984 | Bulanda et al. | 24/16 PB |
| 4,592,734 | A | * | 6/1986 | Metiver | 114/39.19 |
| 4,706,914 | A | * | 11/1987 | Ground | 24/306 |
| 4,893,381 | A | * | 1/1990 | Frankel | 24/16 R |
| 4,939,818 | A | * | 7/1990 | Hahn | 24/16 R |

(List continued on next page.)

FOREIGN PATENT DOCUMENTS

| | | | | |
|---|---|---|---|---|
| GB | 23756 | * | 11/1908 | 248/74.3 |
| GB | 937706 | * | 9/1963 | 248/74.3 |
| GB | 1338602 | * | 11/1973 | 248/74.5 |

OTHER PUBLICATIONS

Polygon Wire Management: Part 1225–25 (from internet).*
Rip–Tie: CableCatch (from internet).*
Cable Management Kits (catalog page).*
Cable Management Solutions (catalog page).*

*Primary Examiner*—Ramon O. Ramirez
*Assistant Examiner*—Jon Szumny
(74) *Attorney, Agent, or Firm*—Mallinckrodt & Mallinckrodt; Robert R. Mallinckrodt

(57) ABSTRACT

An adjustable, removable, strap device primarily for use in bundling and holding electrical cords and cables, such as from office equipment or kitchen appliances, in a compact position above the floor or kitchen counter. Such compact, elevated position in an office helps to prevent tripping and in a kitchen keeps the cords off of the wet counter to reduce the risk of electrical shock, and which also provides a neat, tidy appearance. The device includes a flexible strap member having a plurality of headed pins at a top end and a plurality of mating holes in a bottom end thereof. A transverse slot is disposed adjacent the pins toward the bottom end of the flexible strap member. The strap device is used by doubling over on itself and inserting the bottom end through the transverse slot forming a cable support loop. The pins are engaged into the holes to secure the loop around the cables. The strap device is attached to a wall or other such vertical surface using a nail, double-sided adhesive tape, or adhesives. Multiple strap devices can be connected together to suit the particular cable sizes.

19 Claims, 10 Drawing Sheets

U.S. PATENT DOCUMENTS

Figure 5:
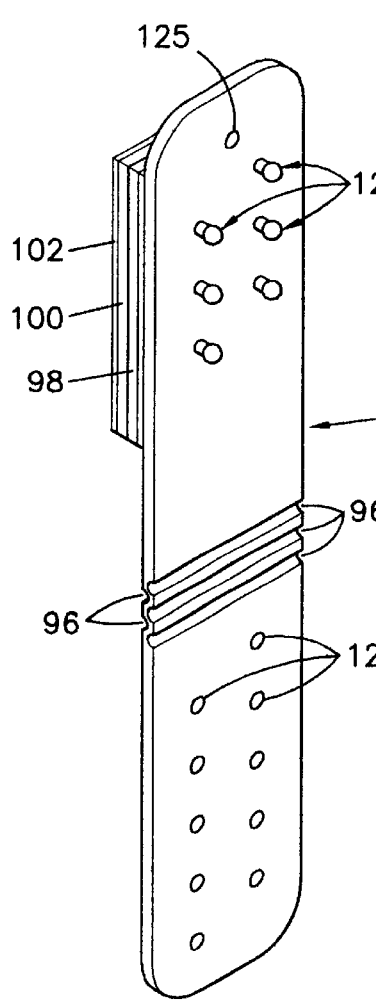

| | | | | |
|---|---|---|---|---|
| 4,988,338 A | * | 1/1991 | Taylor et al. | 128/DIG. 26 |
| 5,031,282 A | * | 7/1991 | Denaro | 24/16 R |
| 5,048,158 A | * | 9/1991 | Koerner | 24/16 PB |
| 5,075,932 A | * | 12/1991 | Hunt et al. | 24/16 PB |
| 5,082,111 A | * | 1/1992 | Corbitt et al. | 128/DIG. 15 |
| 5,123,619 A | * | 6/1992 | Tomlinson et al. | 24/16 R |
| 5,142,743 A | * | 9/1992 | Hahn | 24/16 R |
| 5,163,914 A | * | 11/1992 | Abel | 604/180 |
| 5,169,100 A | * | 12/1992 | Milcent et al. | 248/224.7 |
| 5,263,671 A | * | 11/1993 | Baum | 24/543 |
| 5,560,564 A | * | 10/1996 | Maynard | 242/402 |
| 5,600,098 A | * | 2/1997 | Kazaks | 174/135 |
| 5,878,465 A | * | 3/1999 | Jenner | 24/16 PB |

* cited by examiner

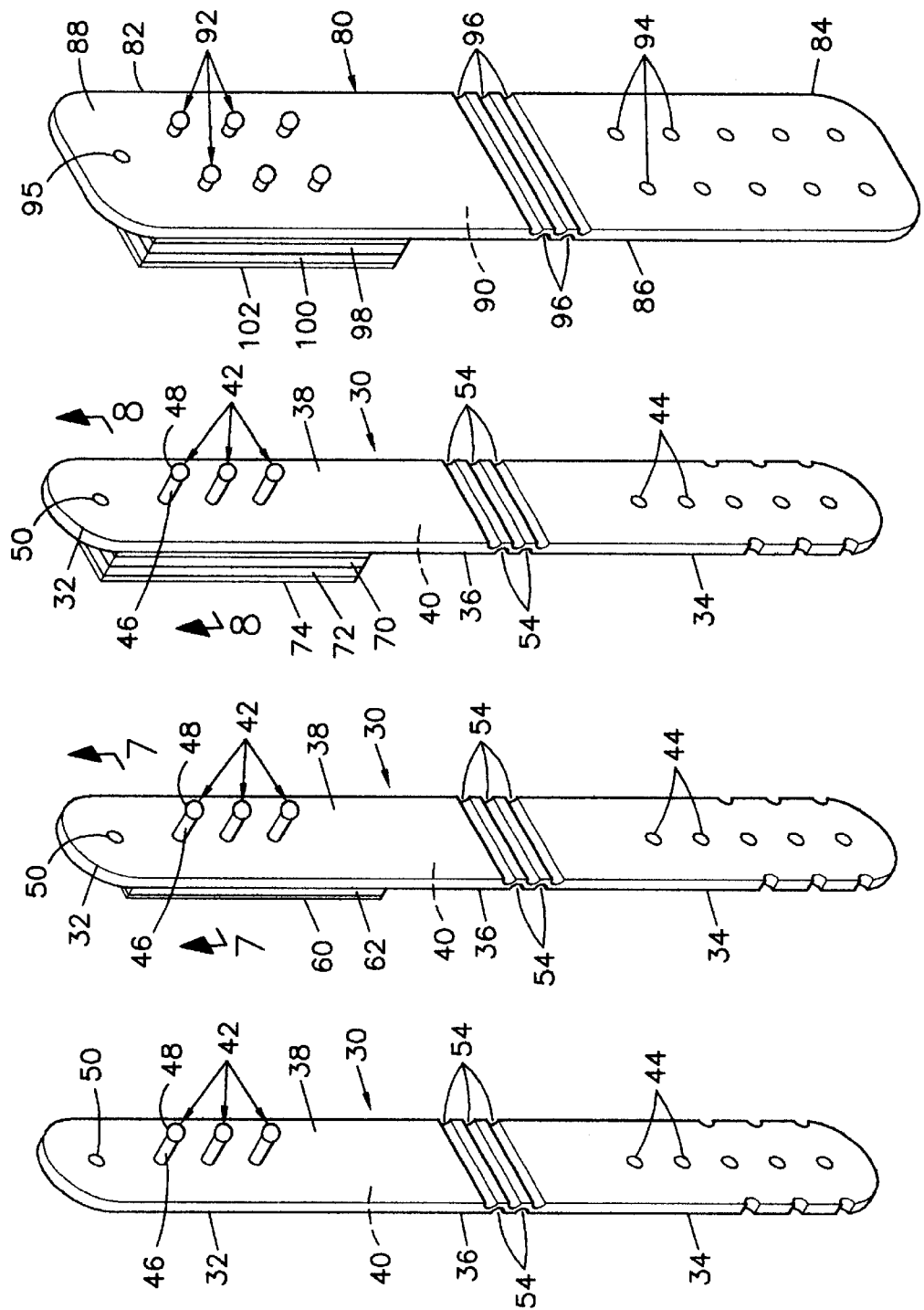

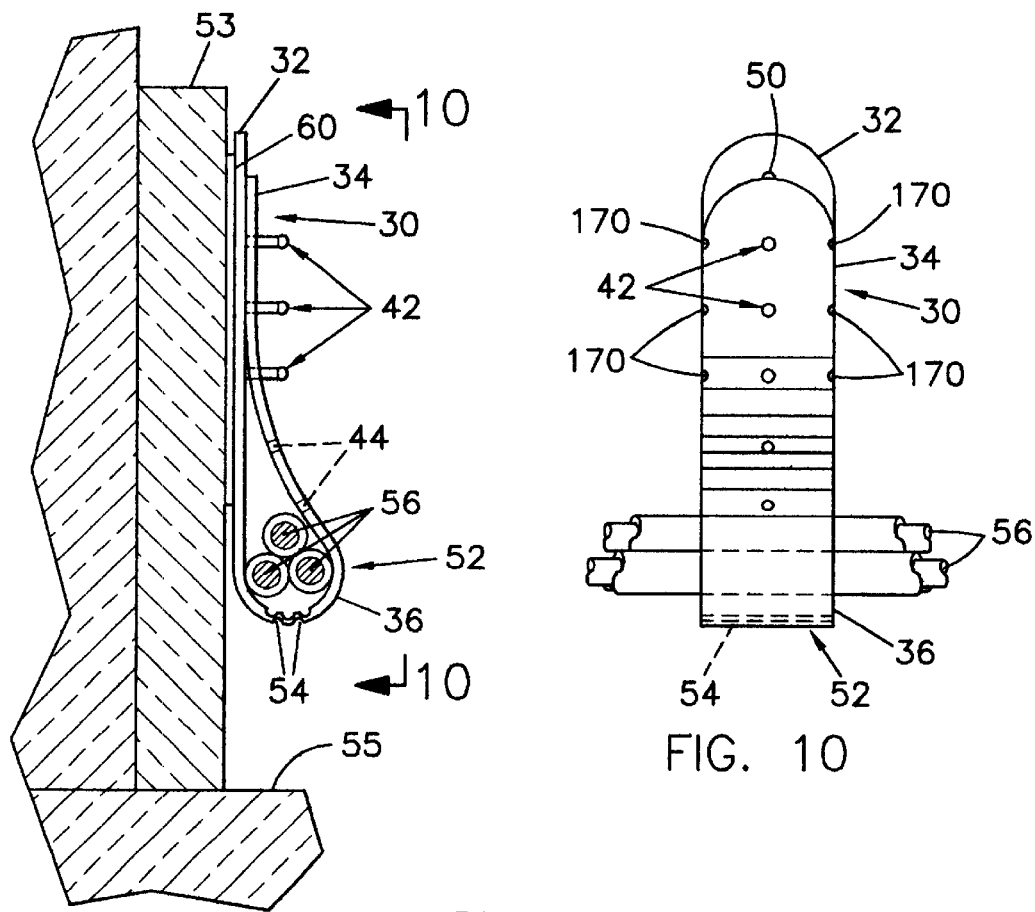
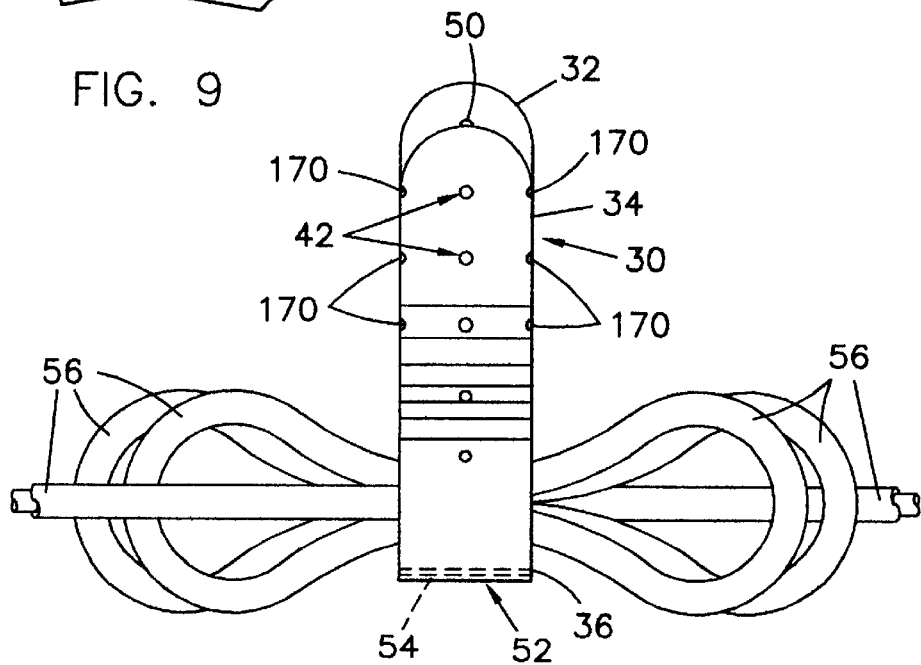
FIG. 9
FIG. 10
FIG. 11

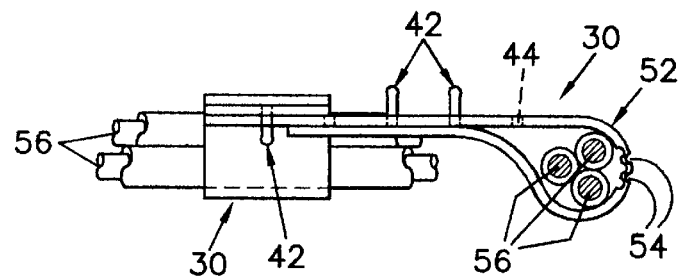
FIG. 15
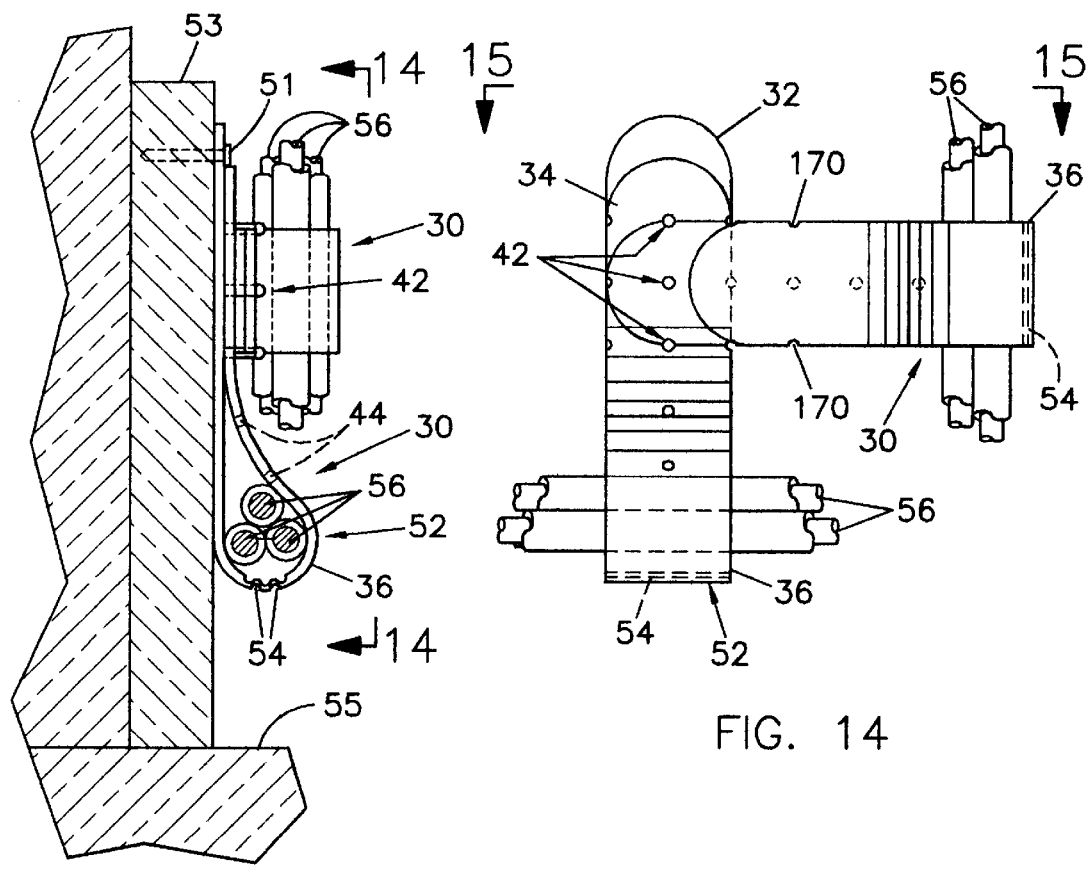
FIG. 14
FIG. 13

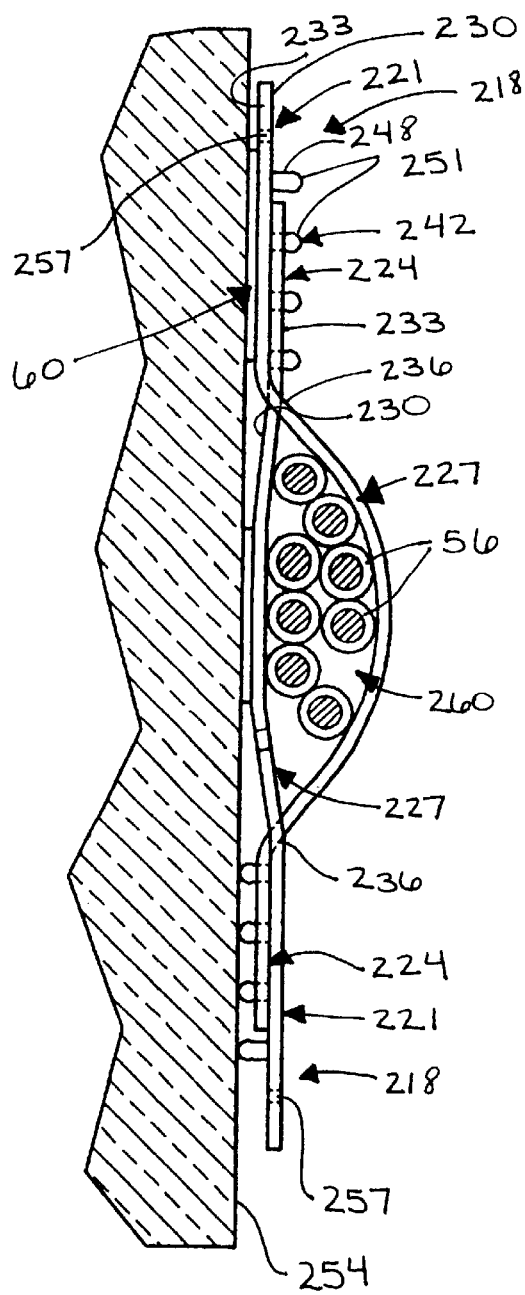
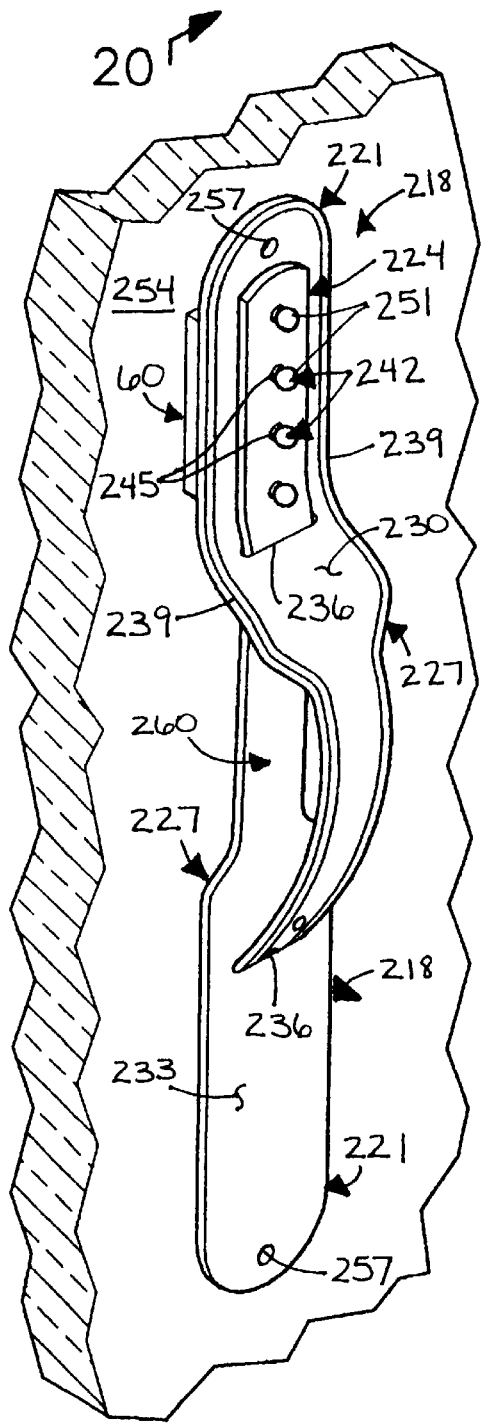
FIG. 20
FIG. 19

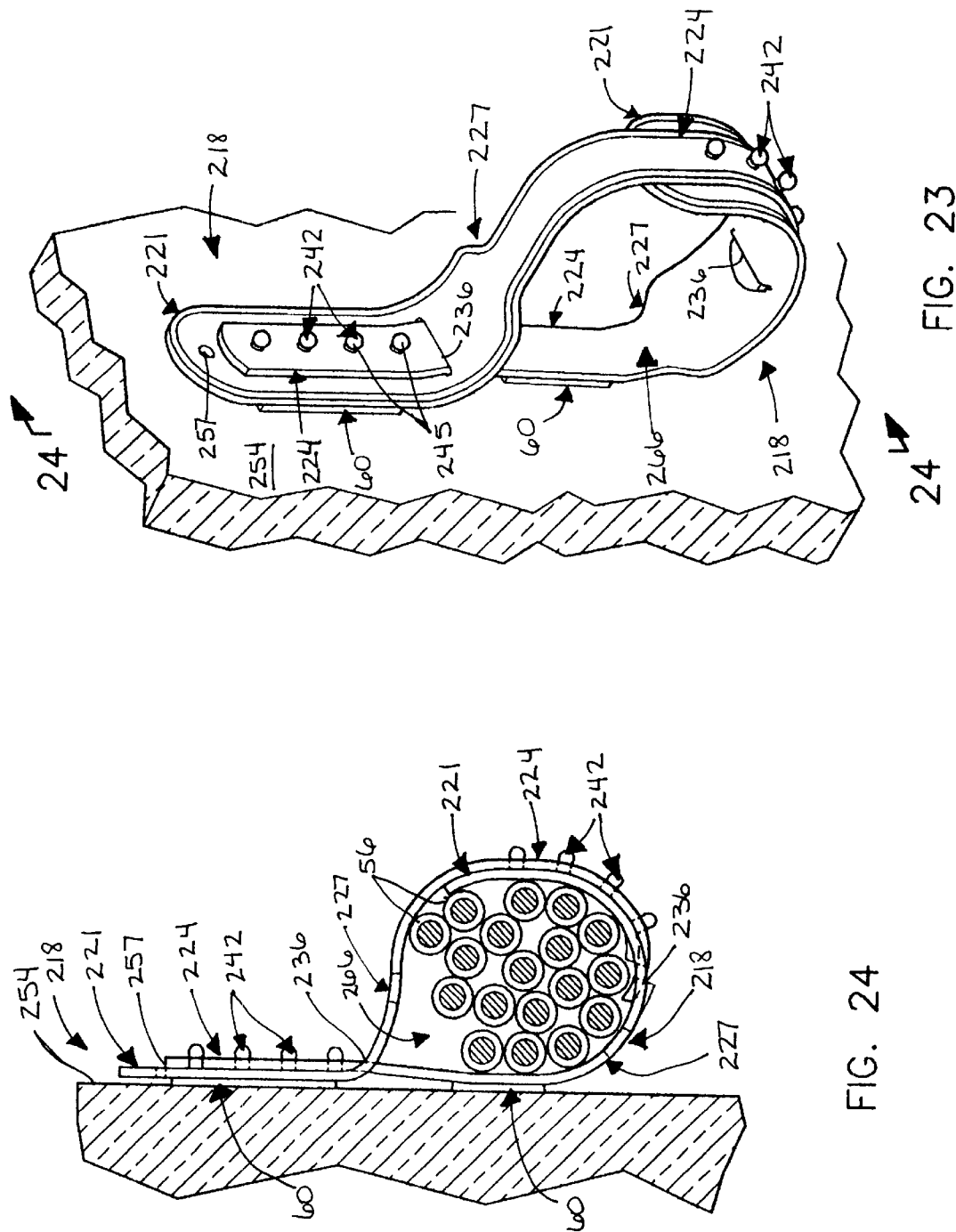

CABLE BUNDLING AND SUPPORT DEVICE

RELATED APPLICATION

This application is a continuation-in-part of my U.S. patent application Ser. No. 09/079,690 filed May 15, 1998, now U.S. Pat. No. 6,349,904.

SPECIFICATION

BACKGROUND OF THE INVENTION

1. Field

The invention is in the field of bundling and support devices of the type which attach to a wall, baseboard, door, or desk to support electrical power supply cords and computer cables off of the floor.

2. State of the Art

Over the past twenty years there has been a proliferation of new electronic and computer devices for the office and home. Such devices make work easier and quicker than prior methods but also create a vast proliferation of electrical power cords and cables, particularly so on desk-top computer systems which have many separate units which must be connected together by cables and many of which have individual power cords. Such cords and cables on computers and other devices are both unsightly and create a real danger of a person tripping over them. In an effort to alleviate such problems, cords and cables are typically pushed against walls, baseboards, and under desks with such efforts having only limited success. Power strips can be used such as at a computer in an attempt to minimize the number of cords running to a wall outlet, but themselves are quite bulky, relatively unsightly, and possibly presenting an even larger tripping hazard to persons than the cords and cables do themselves. Likewise, attempts to bundle cables with rubber bands, twist ties, and self-locking, ratcheting plastic ties are of limited success with such bundles typically remaining on the floor possibly creating an even larger tripping hazard. For example, U.S. Pat. No. 5,142,743 discloses an adjustable bundling device for wrapping and securing bundles of cable, rope, hose, and electrical power cords. The device includes a three-section strap to which hook and loop material is attached in various combinations. The device, however, is not made so as to attach to walls, baseboards, and desks to support such cables, etc. Other devices are commercially available which permanently attach to walls to hold cables, but which cannot be removed for ease of attaching the cables, then reattached to the wall.

SUMMARY OF THE INVENTION

In accordance with the invention, a cable bundling and support device primarily for use bundling and holding electrical and computer cables such as to walls, baseboards, and desks (hereinafter generally referred to as "walls") in an elevated position from the floor for greater tripping safety and for neater appearance.

The cable support device comprises an elongate, flexible strap member having a top portion, a middle portion, and a bottom portion, each of which include front and back surfaces. The strap has a transverse slot of sufficient size to pass the bottom portion therethrough. At least one pin extends generally perpendicularly from the front surface of the top portion. The pin includes a body which terminates in a head spaced from the front surface. The head has a larger lateral cross-sectional area than the body. At least one aperture extends through the bottom portion, with the aperture having a cross-sectional area of less than that of the head of the corresponding pin. The bottom portion is removably fastenable to the top portion, the bottom portion which may be inserted through the transverse slot with the respective surfaces of the top and bottom portions juxtaposed by inserting said at least one pin into said aperture to form a loop for bundling and supporting cables.

The cable support device is attachable to a supporting surface using a nail or screw through a top aperture, double sided adhesive tape, adhesives, or other such devices.

THE DRAWINGS

Figure 6:
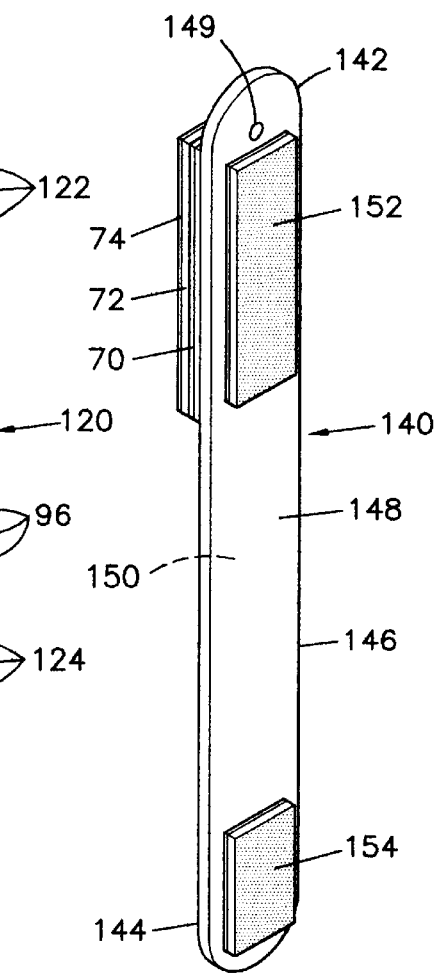
Figure 12:
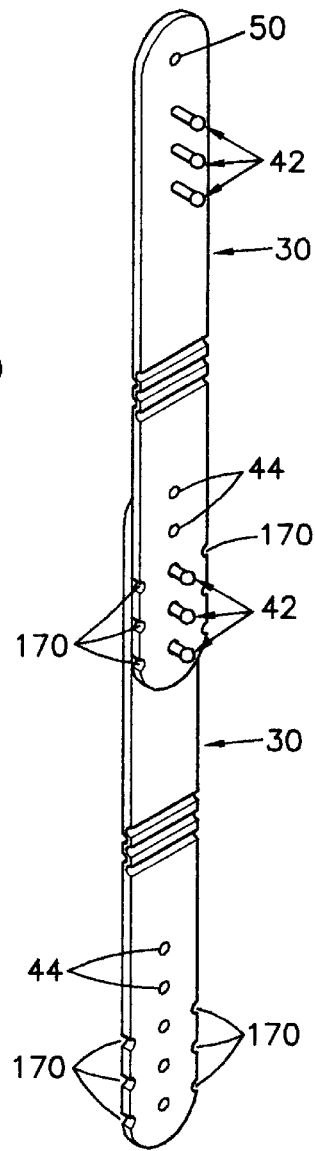
Figure 7:
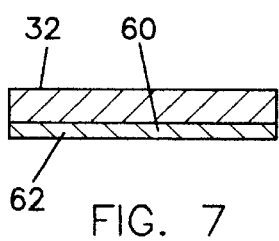
Figure 8:
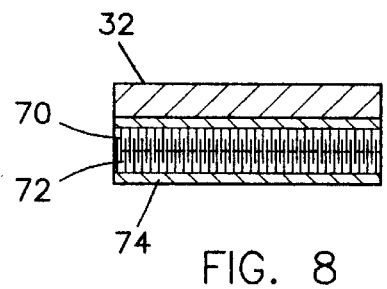
Figure 18:
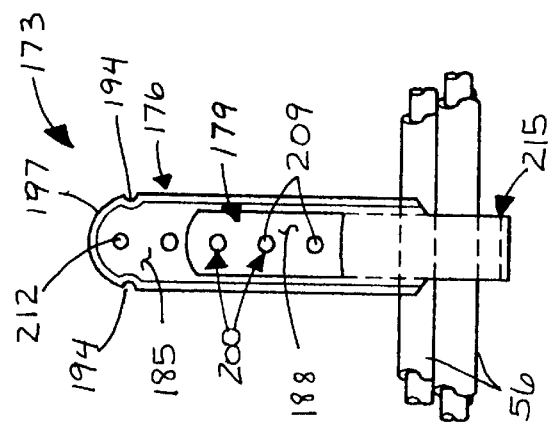
Figure 17:
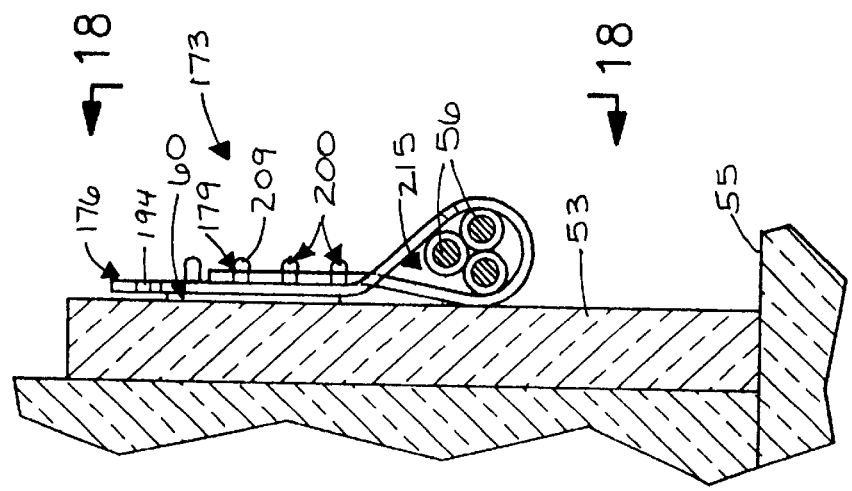
Figure 16:
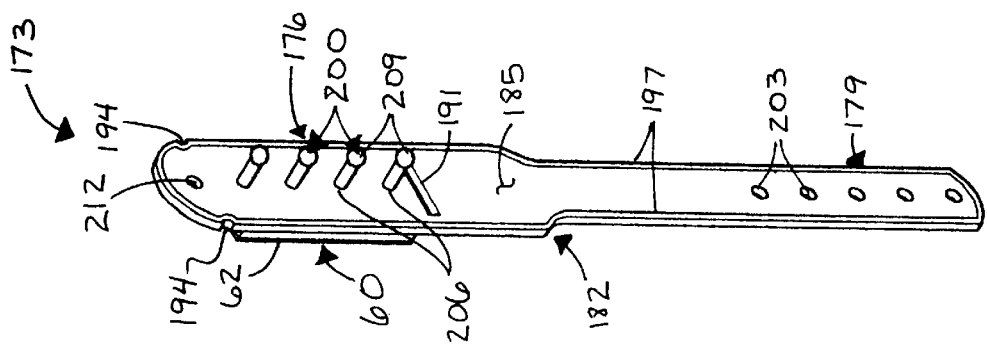
Figures 21, 22:
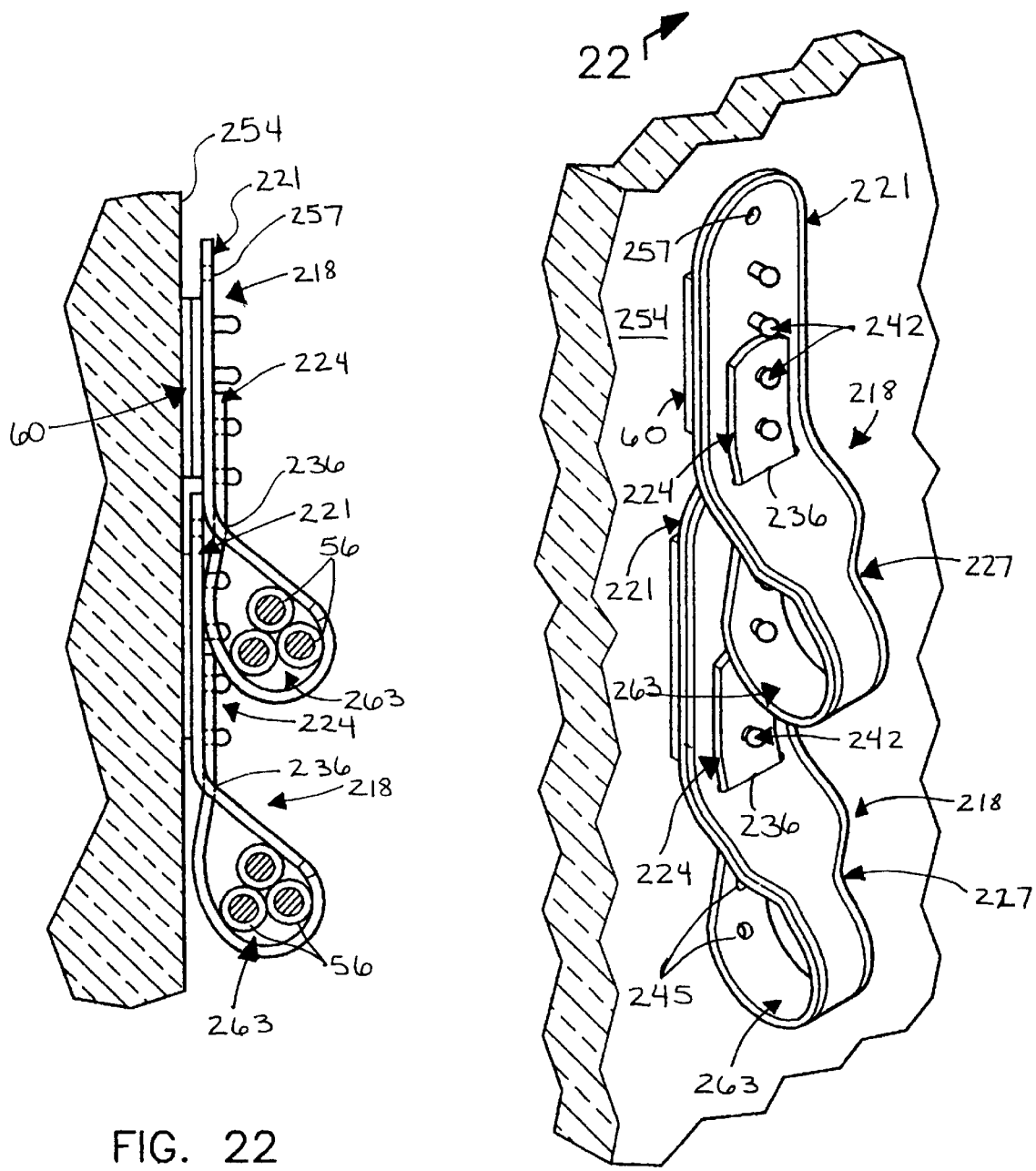
Figure 26:
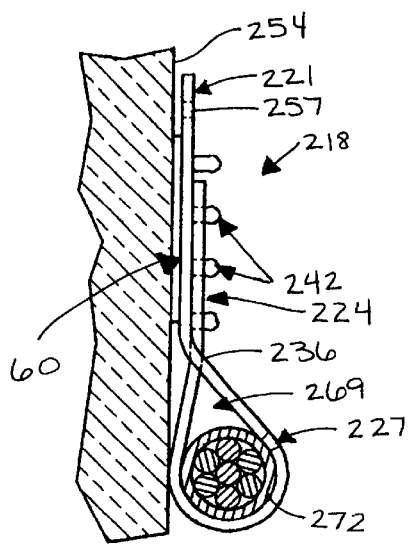
Figure 25:
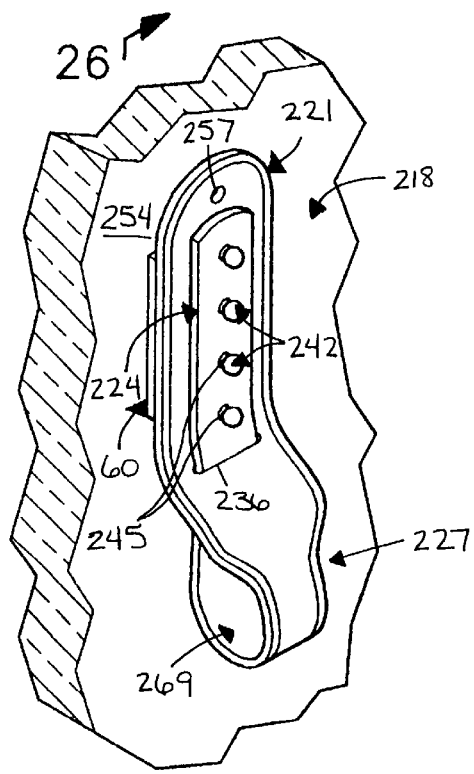
Figure 27:
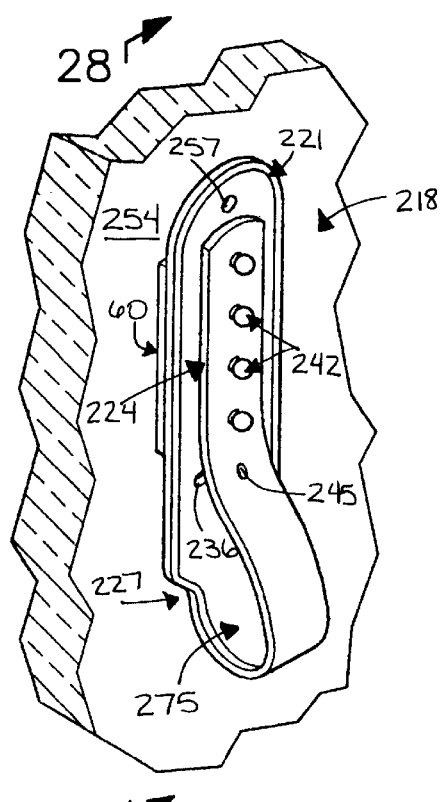
Figure 28:
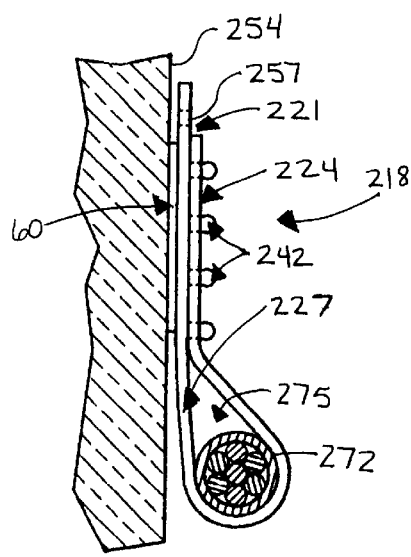
Figure 30:
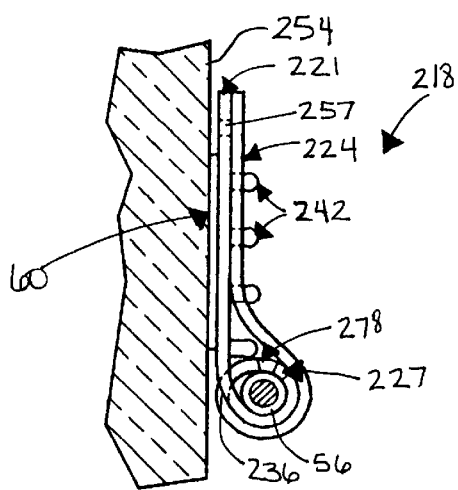
Figure 29:
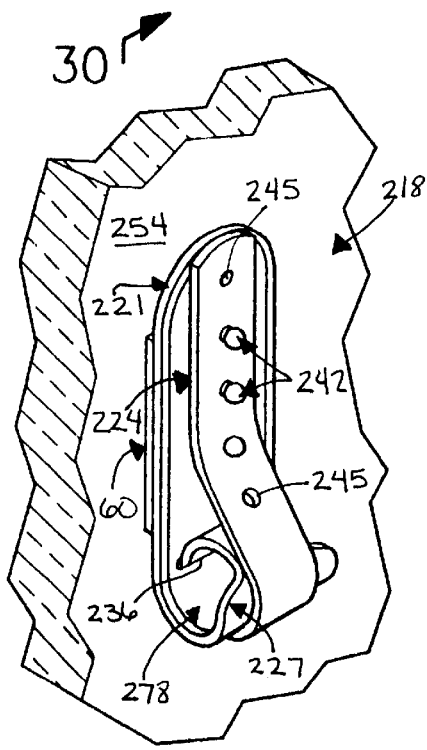
Figure 31:
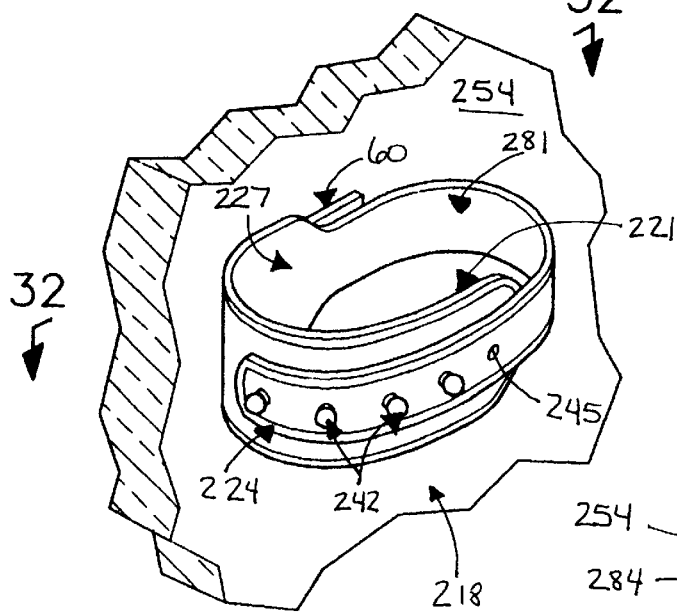
Figure 32:
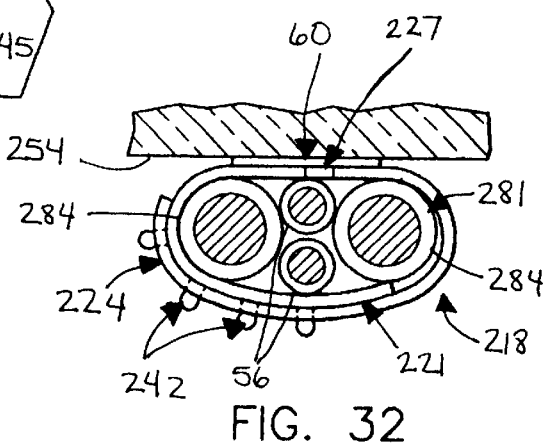

The best mode presently contemplated for carrying out the invention is illustrated in the accompanying drawings, in which:

FIG. 1 is a perspective view of a first embodiment of the invention having a single row of pins and holes and a hole for a nail such as for attachment to a wall;

FIG. 2, a perspective view of a second embodiment of the invention having a paper-covered adhesive strip for attachment to a wall;

FIG. 3, a perspective view of a third embodiment of the invention which has mating removable attachment material on the strap member and a paper-covered mating material for attachment to a wall;

FIG. 4, a perspective view of a fourth embodiment of the invention that is similar to the third embodiment of FIG. 3, but which has double rows of pins and holes;

FIG. 5, a perspective view of a fifth embodiment of the invention that is similar to the fourth embodiment of FIG. 4, but which has the double rows of pins and holes in a staggered relationship;

FIG. 6, a perspective view of a sixth embodiment of the invention that is similar to the third embodiment of FIG. 3, but wherein the plurality of pins and holes are replaced by mating removable attachment material;

FIG. 7, an enlarged lateral vertical sectional view taken on the line 7—7 of FIG. 2 showing the paper-covered adhesive strip for attachment to a wall;

FIG. 8, an enlarged lateral vertical sectional view taken on the line 8—8 of FIG. 3 showing the mating removable attachment material;

FIG. 9, a side elevational view of the second embodiment of FIG. 2 as adhesively attached to a wall holding a plurality of cables;

FIG. 10, a front elevational view taken on the line 10—10 of FIG. 9 showing the cables extending through the loop;

FIG. 11, a front elevational view of the first embodiment of the invention of FIG. 1 showing the cables looped therein to hold extra cable;

FIG. 12, a perspective view of two of the first embodiment of the invention attached together in series to form a longer loop for holding more cable;

FIG. 13, a side elevational view of two of the first embodiment of the invention attached together at right angles to hold cable at right angles such as at a corner;

FIG. 14, a front elevational view taken on the line 14—14 of FIG. 13 showing the attachment together including the side notches which maintain the orientation by engaging the pins;

FIG. 15, top plan view taken on the line 15—15 of FIG. 14 showing the attachment together and closure of the two loops;

FIG. 16, a perspective view of a seventh embodiment of the invention;

FIG. 17, a fragmentary side elevational view of the seventh embodiment of the invention looped to support a plurality of cables on a baseboard;

FIG. 18, a front elevational view taken on the line 18—18 of FIG. 17;

FIG. 19, a fragmentary perspective view of a pair of an eighth embodiment; to form a single loop to support a plurality of cables on a wall;

FIG. 20, a longitudinal vertical sectional view taken on the line 20—20 of FIG. 19 showing a plurality of cables being supported;

FIG. 21, a fragmentary perspective view of a pair of the eighth embodiment of the invention forming a pair of loops to support a plurality of cables on a wall;

FIG. 22, a longitudinal vertical sectional view taken on the line 22—22 of FIG. 21 showing a plurality of cables being supported;

FIG. 23, a fragmentary perspective view of a pair of the eighth embodiment of the invention as connected together end to end to form a single large loop to support a plurality of cables on a wall;

FIG. 24, a longitudinal vertical sectional view taken on the line 24—24 of FIG. 23 showing a plurality of cables being supported;

FIG. 25, a fragmentary perspective view of the eighth embodiment of the invention looped to support a plurality of cables on a wall;

FIG. 26, a longitudinal vertical sectional view taken on the line 26—26 of FIG. 25 showing a single sheathed cable having a plurality of individual conductors being supported;

FIG. 27, a fragmentary side elevational view of the eighth embodiment of the invention looped in a first alternate configuration to support a plurality of cables on a wall;

FIG. 28, a front elevational view taken on the line 28—28 of FIG. 27 showing the eighth embodiment of the invention in the first alternate configuration wherein the bottom portion does not pass through the transverse slot of the top portion supporting the single sheathed cable;

FIG. 29, a fragmentary side elevational view of the eighth embodiment of the invention looped in a second alternate configuration to closely support a single small cable on a wall;

FIG. 30, a front elevational view taken on the line 28—28 of FIG. 27 showing the eighth embodiment of the invention in the second alternate configuration wherein the bottom portion is passed through the transverse slot in a reverse direction to form a smaller double loop supporting the single small cable on a wall;

FIG. 31, a fragmentary side elevational view of the eighth embodiment of the invention looped in a third alternate configuration forming a larger loop to support a plurality of cables on a wall; and FIG. 32, a front elevational view taken on the line 32—32 of FIG. 31 showing the eighth embodiment of the invention in the third alternate configuration wherein the bottom portion is not passed through the transverse slot.

DETAILED DESCRIPTION OF THE ILLUSTRATED EMBODIMENTS

Referring to FIG. 1, therein is shown the first embodiment of the invention which comprises a flexible strap member 30 having a top portion 32, a bottom portion 34, and a middle portion 36. All of the flexible strap members of the invention can be made of plastic, plastic laminated paper, or other flexible material known in the art, with injection-moldable plastics being preferred. Strap member 30 has a front surface 38 and a back surface 40. A fastening means which comprises at least one headed pin 42 extending from front surface 38 at top portion 32, and at least one hole 44 through bottom portion 34 for receiving pin 42. Pin 42 and hole 44 can be generally square, rectangular, or other shape in cross-section so long as they releasibly attach together, but are preferably generally circular in shape and pin 38 being generally circular in lateral cross-section along its length including a body 46. Body 46 can be made of a length preferably slightly longer than a multiple of one, two, or three thicknesses of strap member 30 to allow single or multiple straps 30 to be attached thereto. Body 46 is also preferably of a smaller diameter than hole 44 and which terminates in a head 48 of larger diameter than hole 44 to secure pin 38 in hole 44. An attachment means for mounting strap member 30 to a wall includes a hole 50 for insertion of a screw or nail 51 to mount strap member 30 to a wall or other supporting structure 53, above floor 55, such that cables 56 do not present a tripping hazard by lying on floor 55. (FIG. 13).

Referring to FIGS. 9, 10, and 11, in use, strap member 30 is bent primarily at middle portion 36 such that one or more of pins 42 engage and extend through a respective hole 44 such that head 48 extends beyond back surface 40, with strap member 30 forming a loop 52 for supporting cords or cables 56 extending therethrough in a linear manner, or looped so as to hold excess cable 56. Center portion 36 can include one or more hinge grooves 54 in front surface 38 and/or rear surface 40 to aid center portion 36 in bending more easily. Hinge grooves 54 configurations include placement on one surface only, on both sides and staggered as shown, or on both sides and aligned across from each other.

Referring to FIGS. 2, 9, and 10, an alternate attachment means for mounting strap member 30, rather than using a screw or nail through hole 50, comprises an adhesive means, preferably double-sided adhesive tape 60, which is fastened to back surface 40 at top portion 32. Such adhesive means can include an adhesive, or other means such as single-sided adhesive tape, with the non-sticky side attached to strap member 30 such as by a separate adhesive, riveting, or heat-bonding. A releasible backing paper 62 can be provided for the adhesive means to prevent inadvertent adhesion, which paper is removed prior to attachment to a wall.

Referring to FIG. 3, another alternate attachment means is shown which comprises a first type of interlocking material 70, preferably adhesive-backed, which is fastened to back surface 40 at top portion 32 such as by an adhesive, riveting, or heat-bonding. A second type of interlocking material 72, preferably adhesive-backed, releasibly connects to first type interlocking material 70 and preferably adhesively attaches to a wall, though other means such as separate adhesives, screws, nails, and the like may be used. A releasible backing paper 74 can be provided for the adhesive backing to prevent inadvertent adhesion, which paper 74 is removed prior to attachment to a wall. The first and second type interlocking materials 70 and 72 are preferably VELCRO brand hook and loop material, the hooks thereof which releasibly interlock with the loops thereof to form a junction therebetween which is extremely strong in shear, but easily releasible in the direction perpendicular thereto. Likewise, VELCRO is the preferred first and second interlocking materials in the other embodiments using such fastening and attachment means. This allows strap member 30 to be released from the wall during insertion and removal of cables therefrom which is easier than if strap member 30 is permanently nailed, screwed, or glued to a wall. Upon completion of the insertion or removal of cables therefrom, strap member 30 is reattached to the wall.

In FIG. 4 is shown an alternate embodiment of the invention, primarily for holding heavier cables, which is similar to that shown in FIG. 3, and which comprises a wide strap member 80 having a top portion 82, a middle portion 86, and a bottom portion 84. Wide strap member 80 also has a front surface 88 and a back surface 90. A fastening means which comprises two or more rows of side-by-side headed pins 92, of the same construction as pins 42, of sufficient length to extend through one, two, three, or more thicknesses of strap member 80, extending from front face 88 at top portion 82, and two rows of holes 94, of the same shape and proportionate size as holes 44, through bottom portion 84 for receiving pins 92. A hole 95 may be included in strap member 80 for using a nail or screw (not shown) to mount strap member 80 such as to a wall. Center portion 86 can include one or more hinge grooves 96 in front surface 88 and rear surface 90 to aid center portion 84 to bend more easily. Hinge grooves 96 can be on one or on two sides and staggered as shown aligned. The attachment means is preferably the same as for the embodiment of FIG. 3 though any of the other attachment means can be used, comprising a first type interlocking material 98, preferably adhesive-backed, which is fastened to back surface 90 at top portion 82 such as by an adhesive, riveting, or heat bonding. A second type of interlocking material 100, preferably adhesive-backed, releasibly connects to first type interlocking material 90 and preferably adhesively attaches to a wall, though other means such as separate adhesives, screws, nails, and the like may be used. A releasable backing paper 102 can be provided for the adhesive backing to prevent inadvertent adhesion, which paper 102 is removed prior to attachment to a wall.

In FIG. 5 is shown an alternate embodiment of the invention comprising a wide strap member 120 of similar construction to strap member 80, but having the fastening means which comprise two rows of staggered headed pins 122, typically of the same construction as pins 42 and 92, and two rows of staggered holes 124, typically of the same shape and size as holes 44 and 94, for receiving pins 122. A hole 125 may be included for mounting strap member 120 using a nail or screw (not shown). The attachment means are the same as for the previous wide strap member 80 above.

Referring to FIG. 6, therein is shown an embodiment of the invention which comprises a flexible strap member 140 having a top portion 142, a bottom portion 144, and a middle portion 146. Strap member 140 also has a front surface 148 and a back surface 150. A hole 149 can be included for mounting strap member 140 using a nail or screw (not shown). The fastening means for this embodiment preferably comprises a first type of interlocking material 152, preferably adhesive-backed, which is fastened to front surface 148 at top portion 142 such as by an adhesive, riveting, or heat-bonding. A second type of interlocking material 154, preferably adhesive-backed, is fastened to front surface 148 at bottom portion 144, which first and second types releasibly connect top and bottom portions 142 and 144 of strap member 140 together to form a loop (not shown) as in the previous embodiments of the invention. Center portion 146 can include one or more hinge grooves (not shown) in front surface 148 and rear surface 150 to aid center portion 146 to bend more easily, which grooves can be on one side, or both sides, staggered or aligned. The attachment means is first type interlocking material 70, preferably adhesive-backed, which is fastened to back surface 150 at top portion 142 such as by an adhesive, riveting, or heat-bonding. Second type interlocking material 72, preferably adhesive-backed, releasibly connects to first type interlocking material 70 and preferably adhesively attaches to a wall, though other means such as separate adhesives, screws, nails, and the like may be used. Releasible backing paper 74 can be provided for the adhesive backing to prevent inadvertent adhesion, which paper 62 is removed prior to attachment to a wall.

Referring to FIG. 12, two or more strap members can be linearly connected to form a loop (not shown) of a larger size than when using a single strap member by attaching pins 42 of one of strap members 30 to holes 44 of the other of strap members 30. One of strap members 30 can then be attached such as to a wall (not shown) and a loop formed by engaging one or more of the pins 42 of one strap member 30 to the holes 44 of the other strap member 30. Two or more of strap members 80 or of strap members 120 can likewise be linearly attached together in a similar manner to form a larger loop (not shown).

Referring to FIGS. 13–15, one or more pairs of notches 170 at opposite sides of strap member 30 can be cut from or molded into strap member 30, the distance between which notches being the same as the spacing of pins 42, such that multiple strap members 30 can be attached together at right angles. In such a configuration, notches 170, bearing against pins 42, provide support to maintain the right angle configuration of the strap members 30. The attachment of two straps 30 together at a right angle is particularly useful such as for routing cables 56 vertically from an electrical device (not shown) and then horizontally to a wall outlet (not shown). Likewise, if the spacing between pins 92 in the rows and of holes 94 in the rows is the same as the spacing between rows, and the pins 92 preferably lengthened similar to pins 42, two or more straps 80 can be attached together at right angles. The same can be done for strap 120 for right angle attachment together. When two rows of pins and holes are used, notches such as 170 are not needed to retain the right angle orientation. All of the straps can also be designed to attach at other than right angles by adjusting the respective pin positions, hole positions, and notch positions if needed.

Referring to FIG. 16, therein is shown the seventh embodiment of the invention which comprises a flexible strap member 173 having a top portion 176, a narrower bottom portion 179. and a tapered middle portion 182. Strap member 173 has a front surface 185 and a back surface 188. Middle portion 182 can include one or more hinge grooves (not shown) in front surface 185 and/or back surface 188 to aid middle portion 182 in bending more easily. Hinge groove configurations include placement on one surface only, on both sides and staggered, or on both sides and aligned across from each other. A transverse slot 191 of a length and width to closely receive the bottom portion 179 of the strap member 173 is disposed through top portion 176. A pair of notches 194 extend inwardly into top portion 176. An outer peripheral edging 197 extends around the strap member 173 to reinforce the strap member 173 from cracking and breaking due to repeated bending. and an inner peripheral edging (not shown) can be used around and to reinforce the slot 191. The width of top portion 176 adjacent slot 191 can also be made larger for reinforcement purposes. A fastening means comprises at least one headed pin 200 extending from front surface 185 at top portion 176, and at least one hole 203 through bottom portion 179 for receiving pin 200. Pin 200 and hole 203 can be generally square, rectangular, or other shape in cross-section so long as they releasibly attach together, but holes 203 are preferably generally circular in shape with pin 200 being generally circular in lateral cross-section along its length including a body 206 thereof. Body 206 can be made of a length preferably slightly longer than a multiple of one, two, or three thicknesses of strap member 173 to allow single or multiple strap members 173 to be attached thereto. Body 206 is also preferably of a smaller diameter than hole 203 and terminates at a head 209 of larger diameter than hole 203 to secure pin 200 in hole 203. An attachment means for mounting strap member 173 to a vertically disposed surface (not shown) includes a hole 212 for insertion of a screw or nail (not shown) such as to mount strap member 173 to a baseboard 53 above floor 55 so that cables 56 do not present a tripping hazard by lying on floor 55 (FIG. 17). Preferably, the diameter of hole 212 and notches 194 is the same size as hole 203, and the spacing between respective centers thereof is the same as the spacing between pins 200. An alternate attachment means for mounting strap member 173, rather than using a screw or nail through hole 212, comprises an adhesive means, preferably double-sided adhesive tape 60, which is fastened to back surface 188 at top portion 176. Such adhesive means can include an adhesive, or other means such as single-sided adhesive tape (not shown), with the non-sticky side attached to strap member 173 such as by a separate adhesive, riveting, or heat-bonding. A releasable backing paper 62 can be provided for the adhesive means to prevent inadvertent adhesion, which paper is removed prior to attachment to a wall (not shown).

Referring to FIGS. 17 and 18, in use, strap member 173 is bent primarily at middle portion 182 such that one or more of pins 200 engage and extend through a respective hole 203 such that head 209 extends beyond back surface 188, with strap member 173 forming a loop 215 for supporting cords or cables 56 extending therethrough in a linear manner, or with the cables 56 looped so as to hold excess cable 56.

Referring to FIGS. 19 and 20, therein is shown the eighth embodiment of the invention which comprises a flexible strap member 218 having a top portion 221 which is wider than top portion 176 of strap member 173, a narrower bottom portion 224 which is the same width as bottom portion 179 of strap member 173, and a tapered middle portion 227. Strap member 218 has a front surface 230 and a back surface 233. Middle portion 227 can include one or more hinge grooves (not shown) in front surface 230 and/or back surface 233 to aid middle portion 227 in bending more easily. Hinge groove configurations include placement on one surface only, on both sides and staggered, or on both sides and aligned across from each other. A transverse slot 236 of a length and width to closely receive the bottom portion 224 of the strap member 218 is disposed through top portion 221. A peripheral strap member edging 239 extends around the strap member 218 to reinforce the strap member 218 from cracking and breaking due to repeated bending, and a peripheral slot edging (not shown) can be used around and to reinforce the slot 236. The larger width of top portion 221 adjacent slot 236 reinforces strap member 218 and provides more surface area for indicia (not shown) to be printed and/or molded thereon such as for advertising purposes. A fastening means comprises at least one headed pin 242 extending from front surface 230 at top portion 221, and at least one hole 245 through bottom portion 224 for receiving pin 242. Pin 242 and hole 245 can be generally square, rectangular, or other shape in cross-section so long as they releasibly attach together, but holes 245 are preferably generally circular in shape with pin 242 being generally circular in lateral cross-section along its length including a body 248 thereof. Body 248 can be made of a length preferably slightly longer than a multiple of one, two, or three thicknesses of strap member 218 to allow single or multiple strap members 218 to be attached thereto. Body 248 is also preferably of a smaller diameter than hole 245 and terminates at a head 251 of larger diameter than hole 245 to secure pin 242 in hole 245. An attachment means for mounting strap member 218 to a vertically disposed surface such as a wall 254 includes a hole 257 for insertion of a screw or nail (not shown) so that cables 56 do not present a tripping hazard. An alternate attachment means for mounting strap member 218, rather than using a screw or nail through hole 257, comprises an adhesive means, preferably double-sided adhesive tape 60, which is fastened to back surface 233 at top portion 221. Such adhesive means can include an adhesive, or other means such as single-sided adhesive tape (not shown), with the non-sticky side attached to strap member 218 such as by separate a separate adhesive, riveting, or heat-bonding. A releasable backing paper (not shown) can be provided for the adhesive means to prevent inadvertent adhesion, which paper is removed prior to attachment to the wall 254.

Both of the flexible strap members 173 and 218 can be used singly or in multiples to suit the application. For example in FIGS. 19 and 20, strap member 213 is used in pairs to form a loop 260 by connecting together the pins 242 of one flexible strap member 218 to the apertures 245 of the other. The respective bottom ends 224 extend thorough the transverse slot 236 of the other flexible strap member 221. The loop 260 is large and can hold a plurality of cables 56. Other possible arrangements for pairs of flexible strap members 213 (and flexible strap members 173) are shown in FIGS. 21–32 wherein various other sizes and numbers of loops 263, 266, 269, 275, 278, and 281 to cables 56 and other single and multi-conductor cables 272 and 284.

While the support device is primarily designed for bundling and supporting cables of the size used on appliances and computers, larger versions can be constructed such as to nail to telephone poles to hold large electric cables. Other uses for the device include attaching such as to a wall or door to support coat hangers with cloths, attaching to walls above the counter in a kitchen to bundle and support cords above the potentially wet counter, and any other application wherein the loop can hold the particular object. The color of the strap member can be made to match or contrast with the decor of the environment in which it is used. Clear versions with or without flecks of colored particles therein can be made such as for children's rooms.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. The cable bundling and support device for attachment to a supporting surface, comprising:
   a flexible strap member having a top portion, a middle portion, and a bottom portion which is narrower than the top portion, each of which include front and back surfaces, the top portion being adapted to be secured to the supporting surface with the back surface of the top portion facing the supporting surface, and said strap top portion having a transverse slot sized to pass said narrower bottom portion therethrough;
   at least one pin extending generally perpendicularly from said front surface of said top portion, said at least one pin having a body which terminates in a head spaced from said front surface, said head having a larger lateral cross-sectional area than said body, and at least one aperture extending through said bottom portion, with said at least one aperture having a cross-sectional area of less than that of the head of the corresponding pin; and wherein said bottom portion is looped backwardly with the back surface of the bottom portion inside the loop and is removably fastenable to said top portion when said bottom portion is inserted through said transverse slot, with the respective front surfaces of said top and bottom portions then juxtaposed, by inserting at least one of said at least one pin into at least one of said at least one aperture to form a loop for bundling and supporting cables.

2. The device according to claim 1, wherein there are a plurality of pins and apertures.

3. The device according to claim 1, wherein the bottom portion of the flexible strap member is narrower than the top portion.

4. The device according to claim 1, wherein the at least one pin is generally circular in lateral cross-section and the at least one aperture is generally circular.

5. The device according to claim 1, wherein the flexible strap member is made of plastic.

6. The device according to claim 5, wherein the respective at least one pin and at least one aperture are evenly spaced in a single line such that the size of the loop can be varied to accommodate the size and number of cables by engaging appropriate pins and apertures.

7. The device according to claim 1, further comprising an attachment device which includes an adhesive which may be adhered to at least one surface of the flexible strap member, and which may be adhered to the supporting surface.

8. The device according to claim 1, wherein the flexible strap member includes an outer peripheral edging.

9. The device according to claim 1, further comprising an attachment device which includes a first type of interlocking material which may be adhesively attached to at least one surface of the flexible strap member, and a second type of interlocking material which may be adhesively attached to the supporting surface, wherein the first and second types of interlocking material are a mating combination of materials selected from the group consisting of hook type interlocking material and loop type interlocking material.

10. The device according to claim 1, wherein there are a plurality of pins and apertures, and the bottom portion of the flexible strap member is narrower than the top portion.

11. The device according to claim 10, wherein the at least one pin is generally circular in lateral cross-section and the at least one aperture is generally circular.

12. The device according to claim 11, wherein the flexible strap member is made of plastic.

13. The device according to claim 11, wherein the flexible strap member includes an outer peripheral edging.

14. A cable bundling and support device for attachment to a supporting surface, comprising:

a flexible strap member having a top portion, a middle portion, and a bottom portion, each of which include front and back surfaces, said strap having a transverse slot sized to pass said bottom portion therethrough;

at least one pin extending generally perpendicularly from said front surface of said top portion, said pin having a body which terminates in a head spaced from said front surface, said head having a larger lateral cross-sectional area than said body, and at least one aperture extending through said bottom portion, with said aperture having a cross-sectional area of less than that of the head of the corresponding pin;

wherein said bottom portion is removably fastenable to said top portion, said bottom portion which may be inserted through said transverse slot, with the respective surfaces of said top and bottom portions then juxtaposed by inserting said pin into said aperture to form a loop for bundling and supporting cables; and wherein the flexible strap member includes an additional pin receiving hole disposed through the top portion outward of the pins, and a pair of notches disposed at opposite sides of said flexible strap collinear with said additional pin receiving hole and of sufficient size such that respective first and second of said flexible strap members can be connected together at a generally right angle with one of the pins of a first flexible strap member disposed through one of the holes of a second flexible strap member with the two pins adjacent thereto each disposed in one of said notches said second flexible strap member.

15. A cable bundling and support device for attachment to a supporting surface, comprising:

a plastic flexible strap member having a top portion, a middle portion, and a bottom portion, each of which include front and back surfaces, said strap having a transverse slot sized to pass said bottom portion therethrough;

a plurality of pins extending generally perpendicularly from said front surface of said top portion, each of said pins having a body which terminates in a head spaced from said front surface, said head having a larger lateral cross-sectional area than said body, and a plurality of apertures extending through said bottom portion, with said apertures having a cross-sectional area of less than that of the head of the corresponding pin;

wherein said bottom portion is removably fastenable to said top portion, said bottom portion which may be inserted through said transverse slot, with the respective surfaces of said top and bottom portions then juxtaposed by inserting said pin into said aperture to form a loop for bundling and supporting cables;

wherein the respective pins and apertures are evenly spaced in a single line such that the size of the loop can be varied to accommodate the size and number of cables by engaging appropriate pins and apertures; and wherein the flexible strap member includes an additional pin receiving hole disposed through the top portion outward of the pins, and a pair of notches disposed at opposite sides of said flexible strap collinear with said additional pin receiving hole and of sufficient size such that respective first and second of said flexible strap members can be connected together at a generally right angle with one of the pins of a first flexible strap member disposed through one of the holes of a second flexible strap member with the two pins adjacent thereto each disposed in one of said notches said second flexible strap member.

16. The device according to claim 15, wherein the flexible strap member includes an outer peripheral edging.

17. The cable bundling and support device for attachment to a supporting surface, comprising:

a flexible strap member having a top portion, a middle portion, and a bottom portion which is narrower than the top portion, each of which include front and back surfaces, said strap having a transverse slot sized to pass said bottom portion therethrough;

at least one pin extending generally perpendicularly from said front surface of said top portion, said pin having a body which terminates in a head spaced from said front surface, said head having a larger lateral cross-sectional area than said body, and at least one aperture extending through said bottom portion, with said aperture having a cross-sectional area of less than that of the head of the corresponding pin;

wherein said bottom portion is removably fastenable to said top portion, said bottom portion which may be inserted through said transverse slot, with the respective surfaces of said top and bottom portions then juxtaposed by inserting said pin into said aperture to form a loop for bundling and supporting cables; and wherein the flexible strap member includes an additional pin receiving hole disposed through the top portion outward of the pins, and a pair of notches disposed at opposite sides of said flexible strap collinear with said additional pin receiving hole and of sufficient size such that respective first and second of said flexible strap members can be connected together at a generally right angle with one of the pins of a first flexible strap member disposed through one of the holes of a second flexible strap member with the two pins adjacent thereto each disposed in one of said notches said second flexible strap member.

18. The device according to claim 17, wherein the flexible strap member includes an outer peripheral edging.

19. The device according to claim 18, wherein the at least one pin is generally circular in longitudinal cross-section and the at least one aperture is generally circular.

* * * * *